(12) United States Patent
Akashi et al.

(10) Patent No.: US 10,305,413 B2
(45) Date of Patent: May 28, 2019

(54) MACHINE LEARNING DEVICE WHICH LEARNS CURRENT COMMAND FOR MOTOR, MOTOR CONTROLLER, AND MACHINE LEARNING METHOD

(71) Applicant: FANUC CORPORATION, Yamanashi (JP)

(72) Inventors: Koudai Akashi, Yamanashi (JP); Hidetoshi Uematsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/628,641

(22) Filed: Jun. 21, 2017

(65) Prior Publication Data

US 2018/0026573 A1   Jan. 25, 2018

(30) Foreign Application Priority Data

Jul. 21, 2016   (JP) .................. 2016-143431

(51) Int. Cl.
| | | |
|---|---|---|
| *B65H 23/198* | (2006.01) | |
| *B65H 59/38* | (2006.01) | |
| *B65H 77/00* | (2006.01) | |
| *H02P 29/60* | (2016.01) | |
| *H02P 29/10* | (2016.01) | |
| *G06N 3/02* | (2006.01) | |
| *H02P 21/00* | (2016.01) | |
| *H02P 21/13* | (2006.01) | |

(52) U.S. Cl.
CPC ............... *H02P 29/60* (2016.02); *G06N 3/02* (2013.01); *H02P 21/0025* (2013.01); *H02P 21/13* (2013.01); *H02P 29/10* (2016.02)

(58) Field of Classification Search
CPC ...................................... H02P 29/60
USPC ............................................. 318/6
See application file for complete search history.

(56) References Cited

U.S. PATENT DOCUMENTS

| | | | | |
|---|---|---|---|---|
| 5,365,158 | A * | 11/1994 | Tanaka ............ | H02P 21/09 318/806 |
| 7,243,006 | B2 * | 7/2007 | Richards ............ | G06F 17/5036 318/801 |
| 9,776,640 | B1 * | 10/2017 | Tian ................ | H02P 7/00 |

FOREIGN PATENT DOCUMENTS

| | | |
|---|---|---|
| JP | H7-115800 A | 5/1995 |
| JP | H8-294300 A | 11/1996 |
| JP | 2005-78516 A | 3/2005 |
| JP | 2006-172141 A | 6/2006 |
| JP | 2015-89236 A | 5/2015 |

* cited by examiner

*Primary Examiner* — Erick D Glass
(74) *Attorney, Agent, or Firm* — Hauptman Ham, LLP (57) ABSTRACT

A machine learning device which learns a current command for a motor, the machine learning device including a state observation unit which observes a state variable including a motor rotation speed or a motor torque command of the motor and at least one of a motor torque, a motor current, and a motor voltage of the motor; and a learning unit which learns the current command for the motor based on the state variable.

14 Claims, 7 Drawing Sheets

MACHINE LEARNING DEVICE WHICH LEARNS CURRENT COMMAND FOR MOTOR, MOTOR CONTROLLER, AND MACHINE LEARNING METHOD

RELATED APPLICATIONS

The present application claims priority to Japanese Patent Application No. 2016-143431 filed Jul. 21, 2016, the disclosures of which is hereby incorporated by reference herein in its entirety.

BACKGROUND OF THE INVENTION

1. Field of the Invention

The present invention relates to a machine learning device which learns a current command for a motor, a motor controller, and a machine learning method.

2. Description of the Related Art

Conventionally, a motor has been installed in a machine tool, a forming machine, an injection molding machine, an industrial machine, an industrial and service robot, or the like, and a motor controller which controls such a motor has been used. Further, as the motor (servo motor), for example, using a d-q three-phase coordinate transformation, a three-phase alternating-current permanent magnet synchronous motor (PMSM) has been widely used.

Figure 8A:
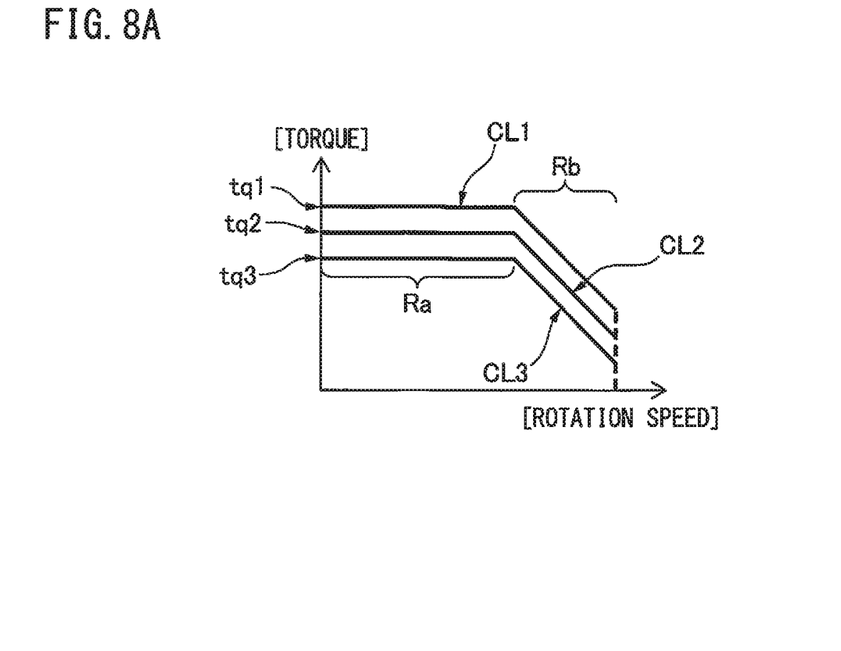
FIG. 8A and FIG. 8B are diagrams for illustrating characteristics of a general motor.
Figure 8B:
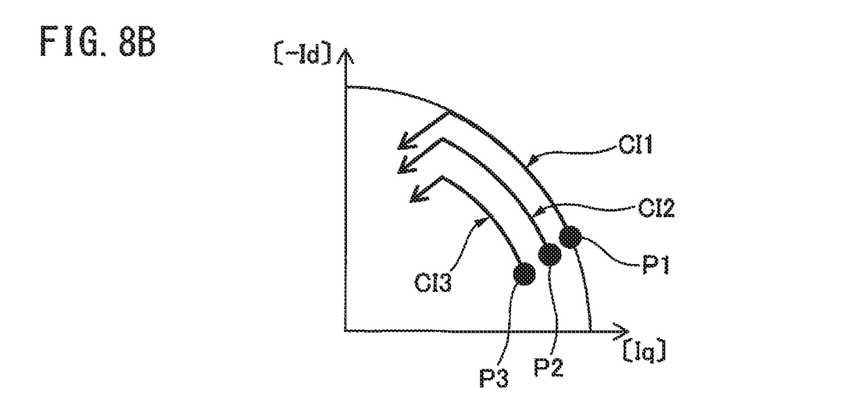

FIG. 8A and FIG. 8B are diagrams for illustrating characteristics of a typical motor, and FIG. 8A illustrates a relationship between a torque and a rotation speed of the motor, and FIG. 8B illustrates a relationship between a d-axis current (−Id) and a q-axis current (Iq) of the motor. As illustrated by characteristic curves CL1, CL2, and CL3 in FIG. 8A, for example, when the torque of the motor is set to magnitudes different from each other, tq1, tq2, and tq3, in a stable region Ra, the torques tq1, tq2, and tq3 as set are maintained and the rotation speed increases. Then, the relationship between −Id and Iq of the motor is fixed at points of reference signs P1, P2, and P3 in FIG. 8B.

Further, as illustrated by the characteristic curves CL1, CL2, and CL3 in FIG. 8A, when the rotation speed of the motor is further increased from the stable region Ra to a region Rb, the torque of the motor decreases from each of tq1. Tq2, and tq3. Then, the relationship between −Id and Iq of the motor changes in such a manner as illustrated by the characteristic curves CI1, CI2, and CI3 in FIG. 8B. Accordingly, the motor (servo motor) determines a current control parameter in accordance with characteristics thereof, which, however, takes a large number of steps, and due to changes of an inductance of the motor by the rotation speed and a current value or influences of magnetic saturation and the like, determining an optimal parameter is difficult.

Incidentally, hitherto, a synchronous motor controller which can achieve a fast torque response by obtaining a suitable operation command of the d-axis current, even when factors which determine a temperature, a torque, and a voltage of a synchronous motor vary, has been proposed (e.g., Japanese Laid-Open Patent Publication No. 2015-089236). Such synchronous motor controller includes a magnetic flux weakening control unit which outputs a d-axis current command value 1 relative to a speed and a voltage for achieving high speed rotation by a magnetic flux weakening control and a maximum torque control unit which outputs a d-axis current command value 2 relative to a q-axis current value for generating a maximum torque. In addition, it is configured that the d-axis current command values 1 and 2 are combined to be a final d-axis current command value of a d-axis current control unit, and a magnetic flux weakening correction unit which corrects at least one of an input signal and an output signal of the magnetic flux weakening control unit and a torque correction unit which corrects an input signal of the maximum torque control unit are provided.

As described above, hitherto, the synchronous motor controller which can achieve a fast torque response by obtaining a suitable current command for the motor, even when factors which determine a temperature, a torque, and a voltage of the motor vary, has been proposed.

However, determining a current control parameter in accordance with characteristics of the motor takes a large number of steps, and for example, due to changes of an inductance of the motor by a rotation speed and a current value of the motor or influences of magnetic saturation and the like, determining an optimal parameter is difficult.

In view of the problem of the conventional technique as described above, it is an object of the present invention to provide a machine learning device that can learn a current command for a motor which is optimal with respect to each motor, a motor controller, and a machine learning method.

SUMMARY OF INVENTION

According to a first aspect of the present invention, there is provided a machine learning device which learns a current command for a motor, the machine learning device including a state observation unit which observes a state variable including a motor rotation speed or a motor torque command of the motor and at least one of a motor torque, a motor current, and a motor voltage of the motor; and a learning unit which learns the current command for the motor based on the state variable observed by the state observation unit.

The machine learning device may further include a decision unit which determines the current command for the motor based on an output of the learning unit. The motor may be a three-phase alternating-current synchronous motor, and the current command for the three-phase alternating-current synchronous motor may include a d-axis current command and a q-axis current command which are electrically and magnetically orthogonal to each other. Learning of the d-axis current command and the q-axis current command may be performed in terms of a rotor phase angle of the three-phase alternating-current synchronous motor.

The learning unit may include a reward calculation unit which calculates a reward based on an output of the state observation unit; and a value function update unit which updates a value function relating to the current command for the motor based on the output of the state observation unit and an output of the reward calculation unit. For each motor rotation speed or motor torque command for the motor, the reward calculation unit may increase the reward when the motor torque increases, decrease the reward when the motor current exceeds a predetermined value, and decrease the reward when the motor voltage is saturated.

The learning unit may include an error calculation unit which calculates an error based on the output of the state observation unit and supervised data; and an error model update unit which updates an error model relating to the current command for the motor based on the output of the state observation unit and an output of the error calculation unit. The machine learning device may further include a neural network. The current command for the motor as learned by the machine learning device may be configured in such a manner that data is mutually shared or exchanged among the plurality of machine learning devices via a communication medium. The machine learning device may be located on a cloud server.

According to a second aspect of the present invention, there is provided a motor controller including the machine learning device according to the above described first aspect; a motor drive unit which drives and controls the motor; and a motor control unit which controls the current command for the motor through the motor drive unit based on the current command for the motor as learned by the machine learning device. The state observation unit may observe a state variable including the motor rotation speed or the motor torque command of the motor, the motor current, and the motor voltage, and the motor torque may be calculated from the motor current and the motor voltage as observed.

According to a third aspect of the present invention, there is provided a machine learning method of learning a current command for a motor, the machine learning method including observing a state variable including a motor rotation speed or a motor torque command of the motor and at least one of a motor torque, a motor current, and a motor voltage for the motor; and learning the current command for the motor based on the state variable as observed. Learning of the current command for the motor may include calculating a reward based on the state variable as observed; and updating a value function relating to the current command for the motor based on the state variable as observed and the reward as observed. In the reward calculation, for each motor rotation speed or motor torque command, the reward may be increased when the motor torque increases, the reward may be decreased when the motor current exceeds a predetermined value, and the reward may be decreased when the motor voltage is saturated.

BRIEF DESCRIPTION OF THE DRAWINGS

The present invention will be understood more clearly by referring to the following accompanying drawings.

DETAILED DESCRIPTION

Figure 1:
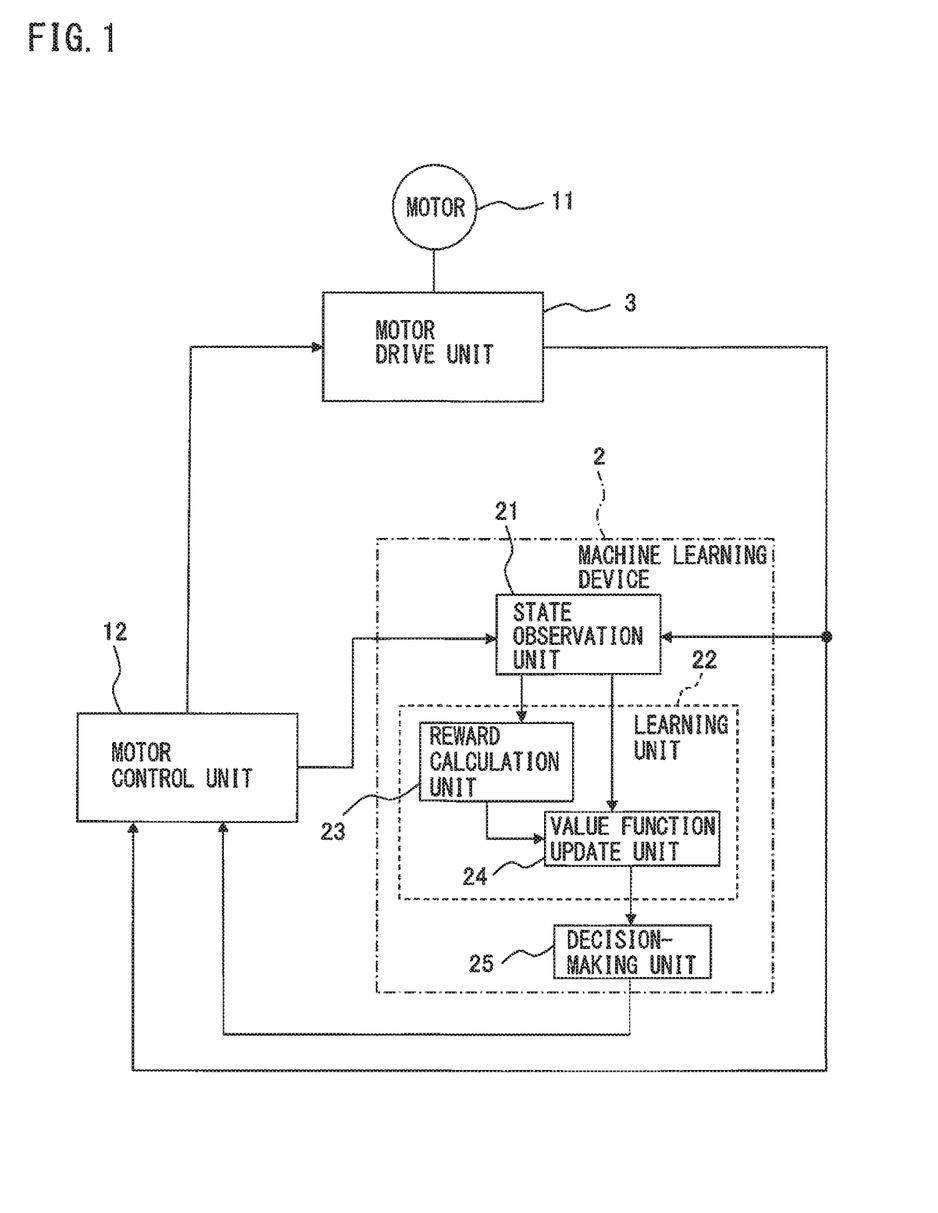
FIG. 1 is a block diagram schematically illustrating an embodiment of a motor controller of the present invention.

Hereinafter, embodiments of a machine learning device, a motor controller, and a machine learning method of the present invention will be described in detail with reference to the accompanying drawings. FIG. 1 is a block diagram schematically illustrating an embodiment of the motor controller of the present invention.

As illustrated in FIG. 1, the motor controller according to the present embodiment is to control a motor 11, and includes a motor control unit 12, a motor drive unit 3, and a machine learning device 2. The motor 11 is a motor used for a machine tool, a forming machine, an injection molding machine, an industrial machine, an industrial and service robot, or the like. Note that the motor control unit 12, the motor drive unit 3, and the machine learning device 2 may be integrated with each other as the motor controller, but also may be separately provided.

As illustrated in FIG. 1, the machine learning device 2 is to, for example, learn a current command for the motor which is set in the motor control unit 12, and includes a state observation unit 21, a learning unit 22, and a decision unit 25. The motor control unit 12 controls the motor 11 through the motor drive unit 3.

The state observation unit 21 observes a state of the motor 11 (motor drive unit 3), and the learning unit 22 learns a current command for the motor 11 based on a state variable (state quantity) observed by the state observation unit 21. The state variable observed by the state observation unit 21 includes, for example, a motor rotation speed (or motor torque command) of the motor 11 and at least one of a motor torque, a motor current, and a motor voltage for the motor 11.

The state variable observed by the state observation unit 21, such as a motor rotation speed (or motor torque command) of the motor 11 and a motor torque, a motor current, and a motor voltage of the motor 11 is inputted from, for example, a sensor (unillustrated) provided to the motor control unit 12, the motor drive unit 3, or the motor 11 to the state observation unit 21. Further, as the motor 11, for example, a three-phase alternating-current synchronous motor, such as a PMSM (three-phase alternating-current permanent magnet synchronous motor using a d-q three-phase coordinate transformation) can be employed, and the current command for the motor 11 which is learned by the learning unit 22 may include, for example, a d-axis current command id* and a q-axis current command iq* which are electrically and magnetically orthogonal to each other.

The learning unit 22 includes a reward calculation unit 23 which calculates a reward based on an output of the state observation unit 21 and a value function update unit 24 which updates a value function relating to the current command for the motor 11 on the basis of the output of the state observation unit 21 and an output of the reward calculation unit 23. In other words, the reward calculation unit 23 calculates the reward based on the state variable observed by the state observation unit 21, and the value function update unit 24 updates the value function of the current command for the motor 11 as determined from the current state variable based on the reward calculated by the reward calculation unit 23.

The reward calculation unit 23 performs reward calculation, for example, for each motor rotation speed (or motor torque command) of the motor 11 such that the reward is increased when the motor torque increases, the reward is decreased when the motor current exceeds a predetermined value, and the reward is decreased when the motor voltage is saturated. Note that the reward calculation by the reward calculation unit 23 (increasing reward (positive reward setting) or decreasing reward (negative reward setting)) will be later described in detail. The decision unit 25 determines the current command for the motor 11 based on an output of the learning unit 22. In other words, the decision unit 25 determines the current command (operation amount) of the motor 11 as learned by the learning unit 22 and outputs the same to the motor control unit 12, and the motor control unit 12 controls the current command for the motor 11 through the motor drive unit 3 on the basis of the current command for the motor 11 as learned by the machine learning device 2.

Figure 2:
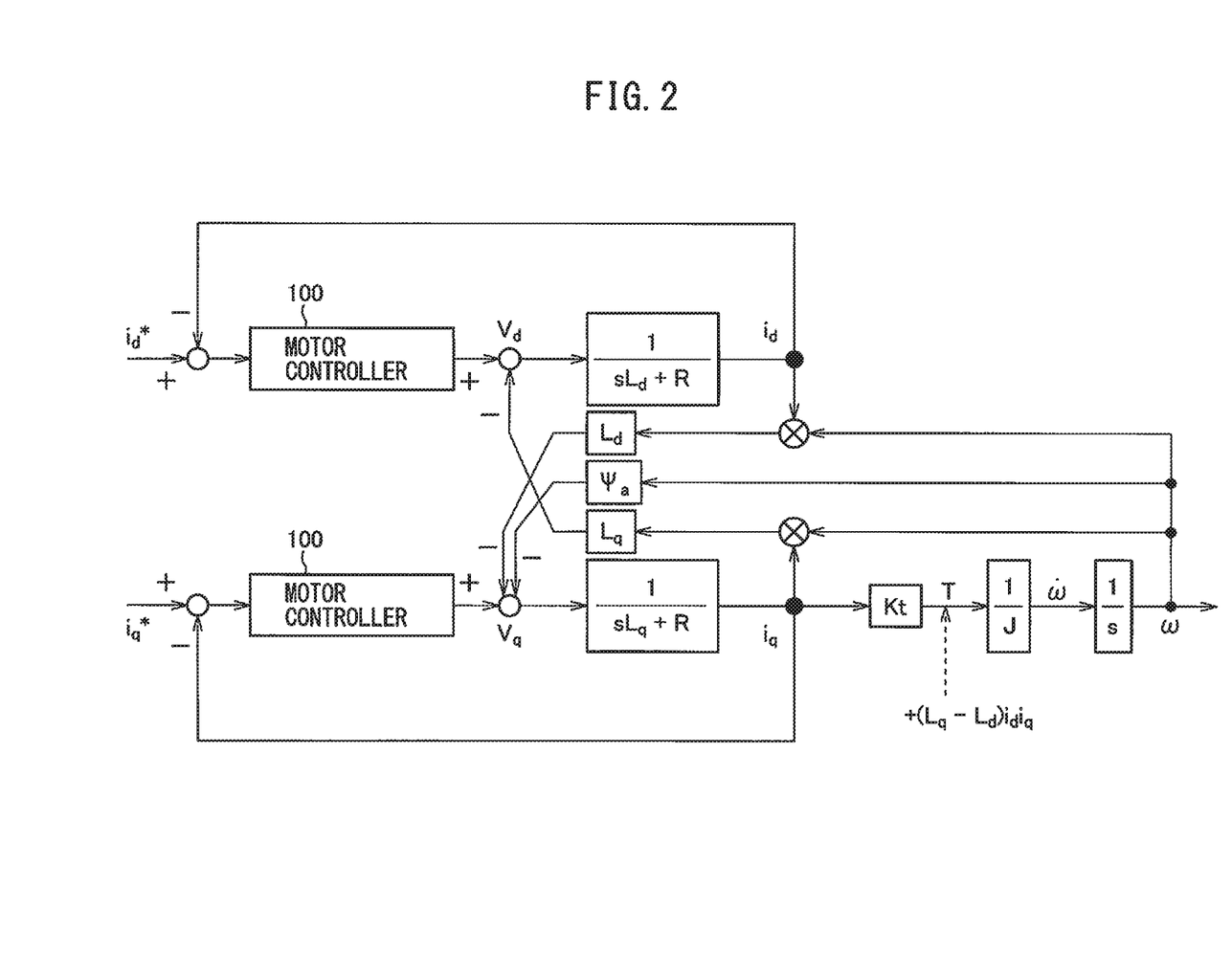
FIG. 2 is a block diagram illustrating an example of the motor controller which controls a three-phase alternating-current motor using a d-q three-phase coordinate transformation.

FIG. 2 is a block diagram illustrating an example of the motor controller which controls a three-phase alternating-current motor using a d-q three-phase coordinate transformation, and is to illustrate an example of the motor controller which controls a PMSM. In a d-q coordinate control system, for example, when a direction of a magnetic pole of a rotor is set to be a d-axis and an axis electrically and magnetically orthogonal to the d-axis is set to be a q-axis, a d-axis current represents an excitation current component used to generate a magnetic flux and a q-axis current represents an armature current component corresponding to a torque of a load.

In FIG. 2, the reference sign iq* denotes a motor current command for the q-axis (q-axis current command), the reference sign id* denotes a motor current command for the d-axis (d-axis current command), a reference sign Vq denotes a motor voltage of the q-axis (q-axis motor voltage), a reference sign Vd denotes a motor voltage of the d-axis (d-axis motor voltage), a reference sign Lq denotes an inductance of the q-axis (q-axis inductance), and a reference sign Ld denotes an inductance of the d-axis (d-axis inductance). Further, a reference sign Ψa denotes a rotor magnetic flux linkage, a reference sign Kt denotes a torque coefficient, a reference sign Ψa denotes a motor torque, a reference sign J denotes a moment of inertia, a reference sign ω dot denotes an angular acceleration, a reference sign ω denotes an angular velocity, and accordingly ω [rad/sec]×(60/2π) signifies a motor rotation speed [min$^{-1}$].

A motor controller 100 outputs drive power for driving the motor 11 based on the d-axis current command id* and the q-axis current command iq* as inputted. Thereby, to the motor, the d-axis voltage Vd and the q-axis voltage Vq are applied, and a d-axis current id and a q-axis current iq flow. Then, among the d-axis voltage Vd of the motor, the q-axis voltage Vq of the motor, the d-axis current id of the motor, and the q-axis current iq of the motor, a voltage equation expressed by the following equation [1] holds true.

$$\begin{bmatrix} V_d \\ V_q \end{bmatrix} = \begin{bmatrix} R + sL_d & -\omega L_q \\ \omega L_d & R + sL_q \end{bmatrix} \begin{bmatrix} i_d \\ i_q \end{bmatrix} + \begin{bmatrix} 0 \\ \omega \Psi_a \end{bmatrix} \quad [1]$$

Further, a motor current ia which is a vector sum of the d-axis current id and the q-axis current iq is calculated by the following equation [2]:

$$ia = \sqrt{iq^2 + id^2} \quad (2)$$

In addition, the torque T of the motor can be calculated by a torque equation expressed by the following equation [3] where a pole pair number of the motor is Pn.

$$t = Pn\Psi a iq + Pn(Lq-Ld)idiq \quad (3)$$

In conventional techniques, for example, the rotor magnetic flux linkage Ψa, the q-axis inductance Lq, and the d-axis inductance Ld of the motor 11 are examined, the angular velocity ω and the q-axis current iq are calculated from the motor rotation speed and the command of the motor torque (motor torque command), and id which maximizes a torque within a limited voltage and current is calculated as a function of ω and iq. Note that a parameter used for such a calculation formula is prepared in advance. Specifically, for example, the following equation [4] is known.

$$i_d = \frac{-\Psi_a + \sqrt{\left(\frac{V_{am}}{\omega}\right)^2 - (L_q i_q)^2}}{L_d} \quad [4]$$

In the present embodiment, the angular velocity ω is determined from the motor rotation speed, the total motor current ia is calculated as a value proportional to the motor torque command. Since ia is the vector sum of id and iq, iq and id generated by division of ia are inputted into the motor as a variable to be learned, and the motor currents iq and id and the motor voltages Vq and Vd are measured.

Then, as described below, for each motor rotation speed and each motor torque command, a reward for iq and id as inputted is determined, and in accordance with such reward, a command value of the motor currents iq, id is changed:

to be positive as the motor torque becomes larger in relation to a change of iq and id, and to be negative if the motor voltage exceeds a voltage limit in relation to a change of iq and id.

Each motor rotation speed signifies a discrete interval, such as 0-1 min$^{-1}$ and 1-2 min$^{-1}$, and each motor torque signifies a discrete interval, such as 0-1 Nm and 1-2 Nm. Further, in learning of iq and id, learning with respect to Φ where iq=i a cos Φ and id=i a sin Φ may be performed. In other words, the current command for the three-phase alternating-current synchronous motor (PMSM) 11 includes the d-axis current command id* and the q-axis current command iq* which are electrically and magnetically orthogonal to each other, and learning of id* and iq* can be performed in terms of a rotor phase angle Φ of the three-phase alternating-current synchronous motor 11.

Incidentally, the machine learning device 2 (4) has functions of analytically extracting, from a set of data as inputted into the device, a useful rule, a knowledge representation, a criterion for judgment or the like contained therein, outputting a result of the judgment, and performing knowledge learning (machine learning). The technique of the machine learning is various, and is broadly classified as, for example, "supervised learning", "unsupervised learning", and "reinforcement learning". Further, there is a technique referred to as "deep learning" that learns extraction of a feature value per se in order to implement these techniques.

Note that the machine learning device 2 as described with reference to FIG. 1 employs "reinforcement learning", and the machine learning device 4 as described later with reference to FIG. 7 employs "supervised learning". Such machine learning devices 2 and 4 may use a general-purpose computer or a processor, but if, for example, general-purpose computing on graphics processing units (GPGPU), large-scale PC clusters or the like is applied, higher processing is possible.

First, supervised learning is a model (error model) in which supervised data, i.e., a large quantity of data sets of certain inputs and results (labels) are provided to the machine learning device 4 to learn features in the data sets and a model (error model) for estimating the results from the input, in other words, their relationship is inductively acquired. For example, it can be implemented using an algorithm, such as a neural network as described below.

Unsupervised learning is a technique in which a large quantity of input data alone are provided to the learning device to learn how the input data is distributed and the device that performs compression, sorting, shaping or the like with respect to the input data performs learning without being provided with corresponding teacher output data. For example, similar features in the data sets can be clustered, and the like. Using this result, it is possible to predict output by allocating outputs such that some criteria is defined to optimize the result.

Note that, as intermediate problem setting between unsupervised learning and supervised learning, there is one referred to as semi-supervised learning. This corresponds to a case, for example, in which there are only some data sets of inputs and outputs and the remaining data are only inputs. In the present embodiment, it is possible to perform learning efficiently, in unsupervised learning, by using data (simulation data and the like) that can be obtained without actually operating the motor.

Next, reinforcement learning will be described further in detail. First, a problem of reinforcement learning is set as follows.

The motor (i.e. a motor mounted to a machine tool, a forming machine, an injection molding machine, an industrial machine, an industrial and service robot, or the like) observes a state of environment and determines action.

Environment changes in accordance with some rule, and further, one's own action may change the environment.

A reward signal returns each time an action is performed.

It is the sum of (discounted) reward over the future, which is desired to be maximized.

Learning starts from a state in which the result caused by an action is not known or only incompletely known. In other words, the motor can acquire the result as data only after it actually operates. In short, it is preferable to explore the optimum action by trial and error.

By setting a state in which prior learning (a technique, such as supervised learning as described above or inverse reinforcement learning) is performed to mimic a human movement as the initial state, learning may be started from a good starting point.

Herein, reinforcement learning is a technique, not only by determination or sorting but also by learning actions, for learning an appropriate action based on interaction provided by an action to environment, i.e., for learning how to maximize the reward obtained in the future. Hereinafter, for example, description is continued with respect to the case of Q-learning, but the machine learning method is not limited to Q-learning.

Q-learning is a method for learning a value Q(s, a) for selecting an action a in a certain environmental state s. In other words, in a certain state s, an action a with the highest value Q(s,a) may be selected as the optimum action. However, first, the correct value for the value Q(s, a) is completely not known for a pair of the state s and the action a. Accordingly, an agent (action subject) selects various actions a under a certain state s and is given a reward for the action a at that time. Consequently, the agent learns to select a better action, i.e., the correct value Q(s, a).

Further, as a result of action, it is desired to maximize the sum of rewards obtained in the future, and finally, it is aimed to satisfy $Q(s, a) = E[\Sigma \gamma^t r_t]$. Herein, the expected value is taken for the case when the state varies in accordance with the optimum action, and since it is not known, it is learned while making exploration). An update formula for such value Q(s, a) may be represented, for example, by equation [5] as follows:

$$Q(s_t, a_t) \leftarrow Q(s_t, a_t) + \alpha \left( r_{t+1} + \gamma \max_a Q(s_{t+1}, a) - Q(s_t, a_t) \right) \quad [5]$$

In the above equation [5], $s_t$ represents a state of the environment at a time t, and $a_t$ represents an action at the time t. The action $a_t$ changes the state to $s_{t+1}$. $r_{t+1}$ represents a reward that can be gained with the change of the state. Further, the term attached with max is the Q-value multiplied by γ for the case where the action a with the highest Q-value known at that time is selected under the state $s_{t+1}$. Herein, γ is a parameter satisfying $0 < \gamma \leq 1$ and referred to as a discount rate. Further, α is a learning factor, which is in the range of $0 < \alpha \leq 1$.

The above equation [5] represents a method for updating the evaluation value $Q(s_t, a_t)$ of the action at in the state $s_t$ on the basis of the reward $r_{t+1}$ returned as a result of the action $a_t$. In other words, it is indicated that when the evaluation value $Q(s_{t+1}, \max a_{t+1})$ of the best action max a in the next state based on reward $r_{t+1}$+action a is larger than the evaluation value $Q(s_t, a_t)$ of the action a in the state s, $Q(s_t, a_t)$ is increased; on the contrary, when $Q(s_{t+1}, \max a_{t+1})$ is smaller, $Q(s_t, a_t)$ is decreased. In other words, it is configured such that a value for a certain action in a certain state is made to be closer to the reward that is instantly returned as a result and the value for the best action in the next state upon that action.

Herein, methods of representing Q(s, a) on a computer include a method in which values for all state-action pairs (s, a) are held as a table (action value table) and a method in which a function approximate to Q(s, a) is prepared. In the latter method, the above equation [5] can be implemented by adjusting parameters of the approximation function using a technique, such as a stochastic gradient descent method. Note that, as the approximation function, a neural network described hereinafter may be used.

Figure 3:
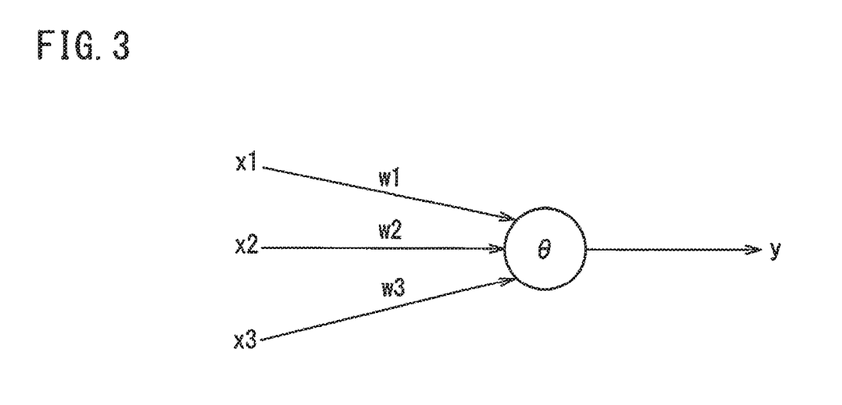
FIG. 3 is a diagram schematically illustrating a model of a neuron.
Figure 4:
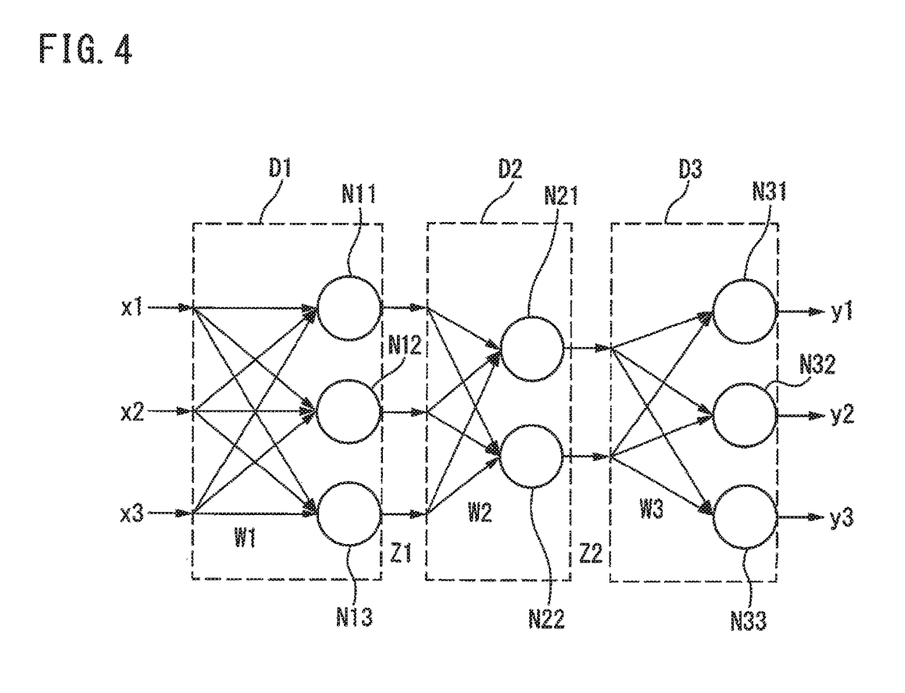
FIG. 4 is a diagram schematically illustrating a three-layer neural network configured by combining the neurons as illustrated in FIG. 3.

Herein, as an approximation algorithm for a value function in reinforcement learning, a neural network may be used. FIG. 3 is a diagram schematically illustrating a model of a neuron, and FIG. 4 is a diagram schematically illustrating a three-layer neural network configured by combining neurons illustrated in FIG. 3. In other words, the neural network is configured, for example, of an arithmetic device simulating a model of a neuron as illustrated in FIG. 3, a memory, and the like.

As illustrated in FIG. 3, the neuron outputs an output (result) y for a plurality of inputs x (in FIG. 3, by way of example, input x1 to x3). Each of the inputs x (x1, x2, x3) is multiplied by a weight w (w1, w2, w3) corresponding to the input x. Thereby, the neuron outputs the result y represented by the following equation [6]. Note that the all of the input x, the result y, and the weight w are vectors. Further, in the equation [6] below, θ is a bias, and $f_k$ is an activation function.

$$y = f_k(\Sigma_{i=1}^n x_i w_i - \theta) \quad (6)$$

Referring to FIG. 4, a description will be given of a neural network having three-layers, which is made up of a combination of neurons as illustrated in FIG. 3. As illustrated in FIG. 4, a plurality of inputs x (by way of example herein, input x1 to input x3) are inputted from the left hand side of the neural network, and a result y (by way of example herein, result y1 to input y3) is outputted from the right hand side. Specifically, the inputs x1, x2, and x3 are multiplied by a weight corresponding to each of three neurons N11 to N13 and inputted. The weights used to multiply these inputs are collectively represented by W1.

The neurons N11 to N13 output z11 to z13, respectively. In FIG. 4, such z11 to z13 are collectively referred to as a feature vector Z1, which may be regarded as a vector which is obtained by extracting feature values of the input vector. The feature vector Z1 is a feature vector defined between the weight W1 and the weight W2. z11 to z13 are multiplied by a weight corresponding to each of the two neurons N21 and N22 and inputted. The weights used to multiply these feature vectors are collectively represented by W2.

The neurons N21 and N22 output z21 and z22, respectively. In FIG. 4, such z21, z22 are collectively represented by a feature vector Z2. The feature vector Z2 is a feature vector defined between the weight W2 and the weight W3. z21 and z22 are multiplied by a weight corresponding to each of the three neurons N31 to N33 and inputted. The weights used to multiply these feature vectors are collectively represented by W3.

Finally, the neurons N31 to N33 output result y1 to result y3, respectively. The operation of the neural network includes a learning mode and a value prediction mode. For example, in the learning mode, the weight W is learned using a learning data set, and in the prediction mode, the action of a robot is determined using the parameters. Note that reference is made to prediction for convenience, but it is needless to say that various tasks, such as detection, classification, inference, and the like, are possible.

Herein, it is possible that the robot can be actually operated in the prediction mode and instantly learn the obtained data to be reflected in the subsequent action (on-line learning) and also that a group of pre-collected data can used to perform collective learning and execute a detection mode with the parameter since then (batch learning). An intermediate case is also possible, where a learning mode is interposed each time data is accumulated to a certain degree.

The weights W1 to W3 can be learned by an error back propagation method. Note that the error information enters from the right hand side and flows to the left hand side. The error back propagation method is a technique for adjusting (leaning) each weight so as to reduce the difference between an output y when an input x is inputted and a true output y (teacher) for each neuron. Such a neural network can have three or more layers (referred to as deep learning). Further, it is possible to extract features of the input step by step and automatically acquire an arithmetic device, which feeds back the results, from the teacher data alone.

Thus, as described above, the machine learning device 2 according to the present embodiment includes the state observation unit 21, the learning unit 22, and the decision unit 25 to perform Q-learning, for example. However, as described above, the machine learning method applied to the present invention is not limited to Q-learning. Note that, as described above, the machine learning (machine learning device 2) can be implemented by employing the GPGPU, the large-scale PC clusters or the like.

Figure 5A:
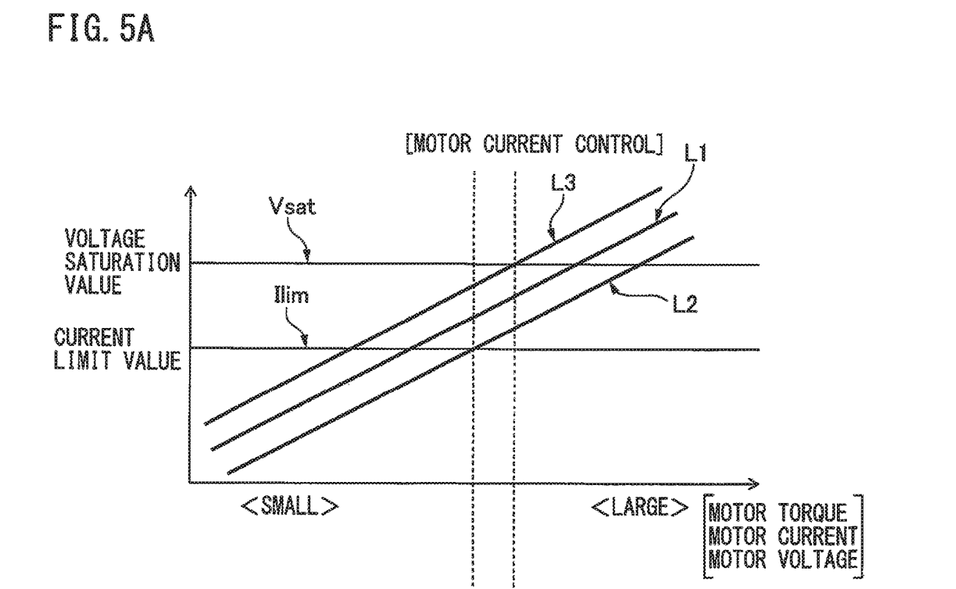
FIG. 5A and FIG. 5B are diagrams for illustrating a motor current control in the motor controller of the present invention.
Figure 5B:
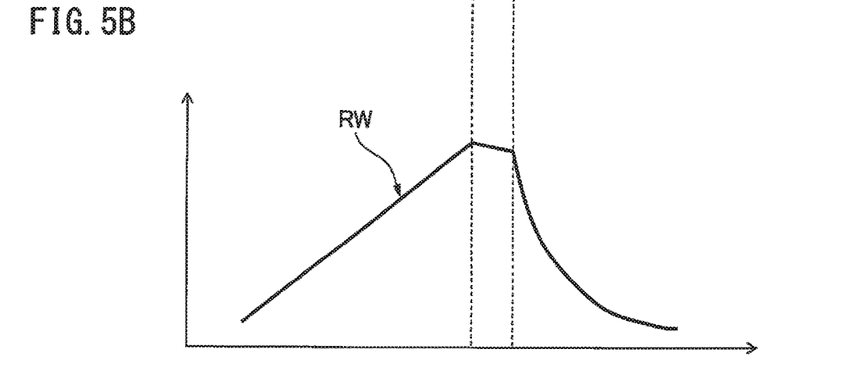

FIG. 5A and FIG. 5B are diagrams for illustrating a motor current control in the motor controller of the present invention, in which FIG. 5A is to illustrate a relationship between the state variables (motor torque, motor current, and motor voltage) and a reward, and FIG. 5B is to illustrate an example of a reward RW as obtained.

As illustrated in FIG. 5A, when a motor torque L1 increases, a positive reward is set (increasing reward) and when the motor torque L1 decreases, a negative reward is set (decreasing reward). In addition, when a motor current L2 exceeds a current limit value (predetermined value) Ilim, a negative reward is set and when the motor current L2 fails to exceed the same, a positive reward is set. Further, when a motor voltage L3 exceeds a voltage saturation value (predetermined value) Vsat, a negative reward is set and when the motor voltage L3 fails to exceed the same, a positive reward is set. To summarize the rewards due to such state variables, the reward (reward curve) RW as illustrated in FIG. 5B is obtained.

Figure 6:
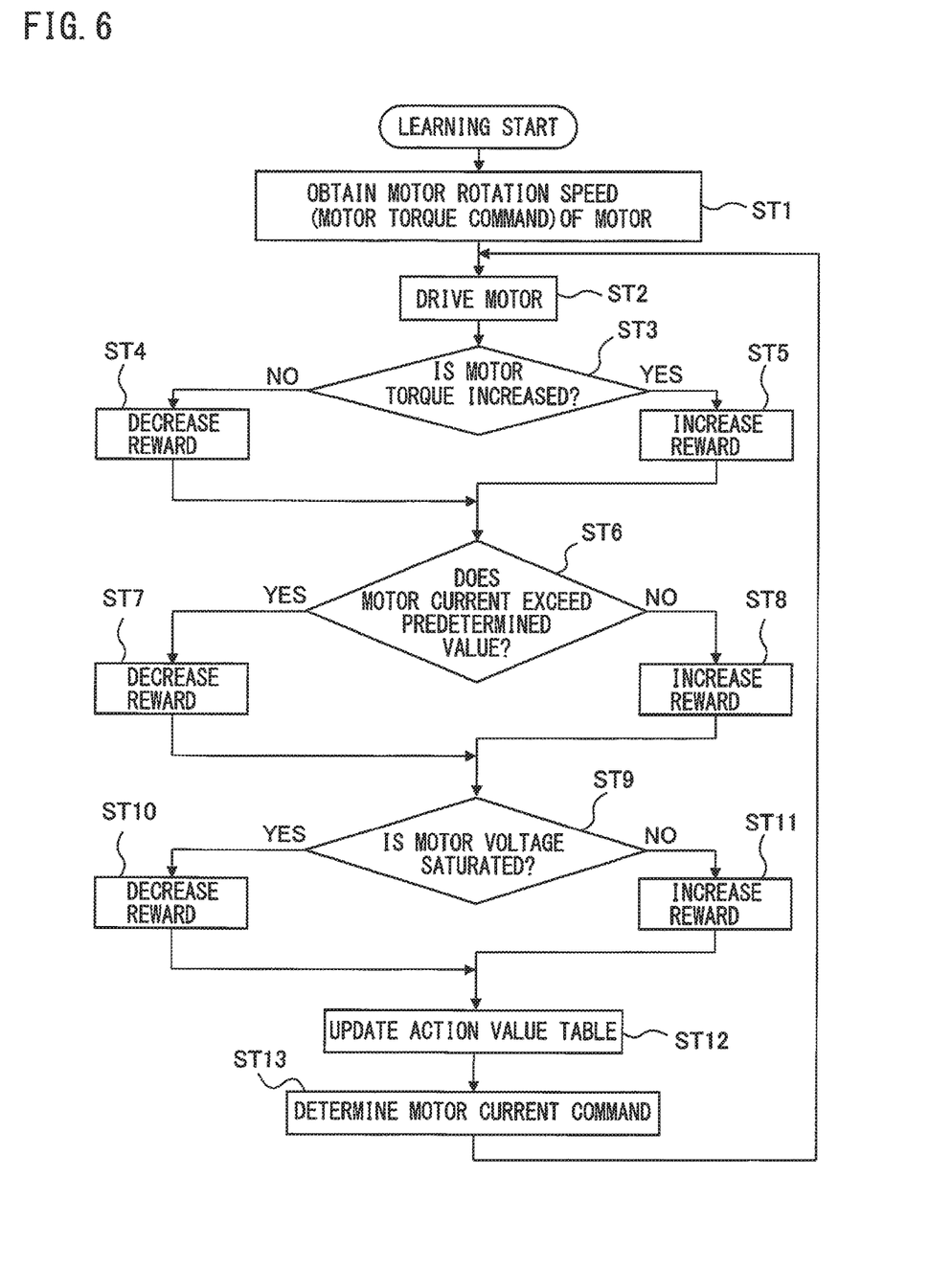
FIG. 6 is a flowchart for illustrating an example of processing in a machine learning device as illustrated in FIG. 1.

FIG. 6 is a flowchart for illustrating an example of processing in the machine learning device as illustrated in FIG. 1. As illustrated in FIG. 6, when the machine learning starts (learning start), at step ST1, the motor rotation speed (motor torque command) is obtained, the process advances to step ST2, and the motor 11 is driven. Obtaining the motor rotation speed at step ST1 can be performed, for example, directly from the motor control unit 12. The process further advances to step ST3, and it is determined whether or not the motor torque (L1) is decreased.

At step ST3, when the motor torque is determined to be not increased (ST3: NO), the process advances to step ST4, and the reward is decreased (a negative reward is set); on the contrary, when the motor torque is determined to be increased (ST3: YES), the process advances to step ST5 and the reward is increased (a positive reward is set); and the process advances to step ST6. At step ST6, it is determined whether or not the motor current (L2) exceeds a predetermined value (current limit value Ilim).

At step ST6, when it is determined that the motor current exceeds the predetermined value (ST6: YES), the process advances to step ST7 and the reward is decreased; on the contrary, when it is determined that the motor current fails to exceed the predetermined value (ST6: NO), the process advances to step ST8 and the reward is increased; and the process advances to step ST9. At step ST9, it is determined whether or not the motor voltage (L3) is saturated, i.e., whether or not the motor voltage exceeds the saturation voltage (Vsat).

At step ST9, when it is determined that the motor voltage is saturated, i.e., the motor voltage exceeds the saturation voltage (ST9: YES), the process advances to step ST10 and the reward is decreased; on the contrary, when it is determined that the motor voltage is not saturated, i.e., the motor voltage fails to exceed the saturation voltage (ST9: NO), the process advances to step ST11 and the reward is increased; and the process advances to step ST12. At step ST12, on the basis of the reward at each of steps ST4, ST5, ST7, ST8, ST10, and ST11, the action value table is updated, and the process advances to step ST13. At step ST13, on the basis of the action value table as updated, the current command for the motor is determined, the process then returns to step ST2 and similar processing is repeated.

Steps ST4, ST5, ST7, ST8, ST10, and ST11 (ST3-ST11) correspond to the processing of the reward calculation unit 23, in which a reward based on the output of the state observation unit 21 is calculated as described above. In addition, step ST12 corresponds to the processing of the value function update unit 24, in which a value function relating to the current command for the motor 11 is updated on the basis of the output of the state observation unit 21 and the output of the reward calculation unit 23 as described above. Further, step ST13 corresponds to the processing of the decision unit 25, in which the current command for the motor 11 is determined on the basis of the output of the value function update unit 24 (learning unit 22) as described above.

Note that, FIG. 6 illustrates a case in which the state observation unit 21 observes the state variable including all of the motor torques, the motor current, and the motor voltage, but the state observation unit 21 may observe the state variable including at least one of these. In other words, according to the present embodiment, the state observation unit 21 observes the state variable including the motor rotation speed or the motor torque command of the motor 11 and at least one of the motor torque, the motor current, and the motor voltage; the reward calculation unit 23 calculates a reward based on the output of the state observation unit 21; and the value function update unit 24 updates a value function relating to the current command for the motor 11 based on the output of the state observation unit 21 and the output of the reward calculation unit 23. Then, the decision unit 25 determines the current command for the motor 11 based on the output of the value function update unit 24. Thereby, learning the current command for the motor which is optimal to each motor (motor rotation speed and motor torque command) is enabled.

In the above description, for example, with respect to the motor torque command (torque command for the motor), the current control (current control of the motor), which allows a total current to be minimum, may be learned. In such a case, a control loop, a calculation formula, and a division method similar to those described above may be employed. Further, the angular velocity ω is determined from the motor rotation speed, and the motor current iq, for example, is determined as a value proportional to the motor torque command. In other words, as in the above equation [2], considering that the motor current ia is a vector sum of the d-axis current id and the q-axis current iq, id to be learned is inputted as a variable to the motor and the motor currents (Iq and Id) and the motor voltages (Vq and Vd) can be measured.

Then, for each motor rotation speed and each motor torque command, a reward for id to be inputted to the motor is determined, and in accordance with such reward, a command value of the motor current (d-axis current) id is changed (updated). Specifically, for example, a positive reward is set when the torque as commanded is generated and the voltage fails to exceed the voltage limit (Vsat) even when id is decreased, and a negative reward is set when either thereof fails to be achieved.

Further, it is also possible to calculate the motor torque from a current actually flowing in the motor (actual motor current) and control the motor torque. In other words, it is also possible to measure the actual rotation speed, the actual motor currents (Iq, Id), actual motor voltages (Vq, Vd) actually applied to the motor, and calculate the motor torque, assuming that the motor torque is proportional to the q-axis current Iq, without measuring the motor torque. Note that it is also possible to perform the maximum torque control described above and the total current minimum control using the motor torque as calculated.

Figure 7:
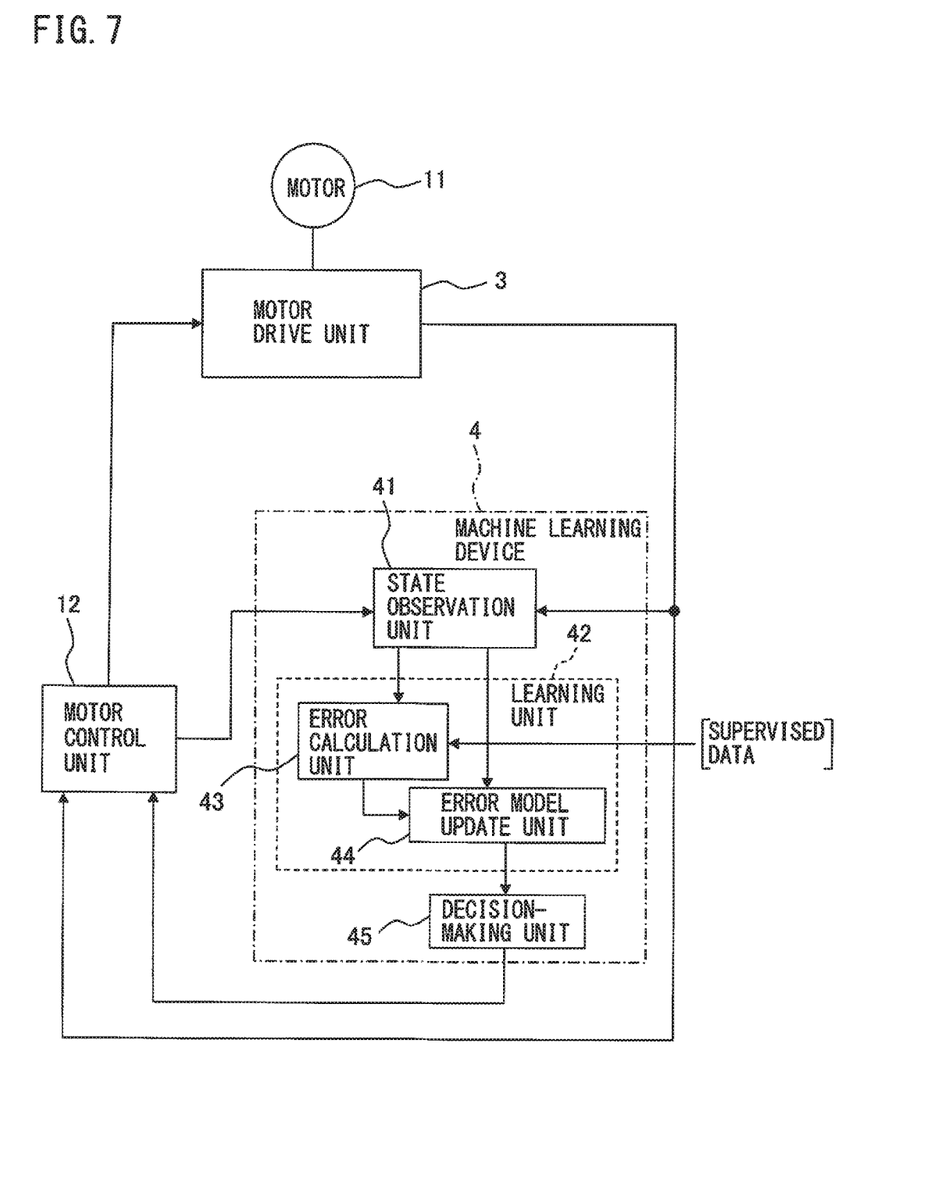
FIG. 7 is a block diagram schematically illustrating another embodiment of the motor controller of the present invention.

FIG. 7 is a block diagram schematically illustrating another embodiment of the motor controller of the present invention, and illustrates a motor controller which employs supervised learning. As apparent from comparison with FIG. 1 as described above, the motor controller which employs supervised learning as illustrated in FIG. 7 is configured in such a manner that the motor controller which employs Q-learning (reinforcement learning) as illustrated in FIG. 1 is provided with supervised data (data with results (labels)).

As illustrated in FIG. 7, the machine learning device 4 in the motor controller which employs supervised learning includes a state observation unit 41, a learning unit 42, and a decision unit 45. The learning unit 42 includes an error calculation unit 43 and an error model update unit 44. Note that also in the machine learning device 4 according to the present embodiment, the state observation unit 41 observes the state variable including the motor rotation speed or the motor torque command of the motor 11 and at least one of the motor torque, the motor current, and the motor voltage for the motor 11; and the learning unit 42 learns the current command for the motor 11 on the basis of the state variable observed by the state observation unit 41.

As illustrated in FIG. 7, the learning unit 42 includes the error calculation unit 43 and the error model update unit 44; and the error calculation unit 43 and the error model update unit 44 respectively correspond to the reward calculation unit 23 and the value function update unit 24 in the motor controller which employs Q-learning as illustrated in FIG. 1. However, there is a difference in a configuration from those described with reference to FIG. 1, in which the error calculation unit 43 according to the present embodiment receives input of external supervised data and an error model is updated by the error model update unit 44 such that a difference between such supervised data and the error model is reduced.

In other words, the error calculation unit 43 receives an output of the state observation unit and the supervised data and calculates an error between data with results (labels) and an output of the error model implemented in the learning unit 42. As the supervised data, for example, when the same motor controller makes the same industrial machine, robot, or the like perform the same operation, data with labels obtained by the day before a predetermined day on which the operation is actually performed can be held and provided as the supervised data to the error calculation unit 43 on the predetermined day.

Alternatively, it is also possible that data obtained by a simulation performed outside the motor controller (industrial robot, robot, or the like) and the like or data with labels of another motor controller is provided to the error calculation unit 43 of such motor controller as the supervised data via a memory card or a communication line. Further, it is also possible that the supervised data (data with labels) is held in a non-volatile memory, such as flash memory, built into the learning unit 42 and the data with labels held in the non-volatile memory is used, as it is, in the learning unit 42.

In the above description, when a motor control system provided with the plurality of motor controllers is considered, for example, the machine learning device 2 (4) is provided to each of the motor controller, and the plurality of machine learning devices 2 (4) provided to the plurality of motor controllers can mutually share or exchange data via a communication medium. Further, the machine learning device 2 (4) can be also located on a cloud server.

Thus, in the machine learning device of the present invention, it is also possible to apply not only "reinforcement learning" but also various machine learning methods, such as "supervised learning", "unsupervised learning" or "semi-supervised learning".

The machine learning device, the motor controller, and the machine learning method of the present invention provides such an effect that it is possible to learn a current command for a motor optimal to each motor.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device configured to learn a current command for a motor, the machine learning device comprising:
a state observation unit configured to observe state variables including
(a) a motor rotation speed or
(b) a motor torque command of the motor, and
at least one of
(c) a motor torque,
(d) a motor current, and
(e) a motor voltage of the motor; and
a learning unit configured to learn the current command for the motor based on the state variables observed by the state observation unit, wherein
the learning unit includes a reward calculation unit configured to calculate a reward based on an output of the state observation unit,
the learning unit is configured to update, based on the calculated reward, a value function relating to the current command for the motor, and
the reward is increased or decreased in response to at least one of the motor torque, the motor current, or the motor voltage observed by the state observation unit.

2. The machine learning device according to claim 1, further comprising a decision unit configured to determine the current command for the motor based on an output of the learning unit.

3. The machine learning device according to claim 1, wherein
the motor is a three-phase alternating-current synchronous motor, and
the current command for the three-phase alternating-current synchronous motor includes a d-axis current command and a q-axis current command which are electrically and magnetically orthogonal to each other.

4. The machine learning device according to claim 3, wherein learning of the d-axis current command and the q-axis current command is performed in terms of a rotor phase angle of the three-phase alternating-current synchronous motor.

5. The machine learning device according to claim 1, wherein
for each motor rotation speed or motor torque command for the motor, the reward calculation unit is configured to
increase the reward when the motor torque increases,
decrease the reward when the motor current exceeds a predetermined value, and
decrease the reward when the motor voltage is saturated.

6. A machine learning device configured to learn a current command for a motor, the machine learning device comprising:
a state observation unit configured to observe state variables including
a motor rotation speed or a motor torque command of the motor, and
at least one of a motor torque, a motor current, and a motor voltage of the motor; and
a learning unit configured to learn the current command for the motor based on the state variables observed by the state observation unit,
wherein the learning unit includes:
an error calculation unit configured to calculate an error based on the output of the state observation unit and supervised data; and
an error model update unit configured to update an error model relating to the current command for the motor based on the output of the state observation unit and an output of the error calculation unit.

7. The machine learning device according to claim 1, wherein the machine learning device further comprises a neural network.

8. The machine learning device according to claim 1, wherein the machine learning device is configured to mutually share or exchange the current command for the motor as learned by the machine learning device among a plurality of machine learning devices via a communication medium.

9. The machine learning device according to claim 1, wherein the machine learning device is located on at least one server in a cloud.

10. A motor controller, comprising:
the machine learning device according to claim 1;
a motor drive unit configured to drive and control the motor; and
a motor control unit configured to control the current command for the motor through the motor drive unit based on the current command for the motor as learned by the machine learning device.

11. The motor controller according to claim 10, wherein
the state observation unit is configured to observe both the motor current and the motor voltage, and
the motor torque is calculated from the motor current and the motor voltage as observed.

12. A machine learning method of learning a current command for a motor, the machine learning method comprising:
observing state variables including
(a) a motor rotation speed or
(b) a motor torque command of the motor, and
at least one of
(c) a motor torque,
(d) a motor current, and
(e) a motor voltage for the motor; and
learning the current command for the motor based on the state variables as observed, wherein
the learning of the current command for the motor includes:
calculating a reward based on the state variables as observed; and
updating a value function relating to the current command for the motor based on the state variables as observed and the reward as calculated.

13. The machine learning method according to claim 12, wherein in the reward calculation, for each motor rotation speed or motor torque command,
the reward is increased when the motor torque increases,
the reward is decreased when the motor current exceeds a predetermined value, and
the reward is decreased when the motor voltage is saturated.

14. A machine learning method of learning a current command for a motor, the machine learning method comprising:
observing state variables including
a motor rotation speed or a motor torque command of the motor, and
at least one of a motor torque, a motor current, and a motor voltage for the motor; and learning the current command for the motor based on the state variables as observed, wherein the learning of the current command for the motor includes:
  calculating an error based on the state variables as observed and supervised data; and
  updating an error model relating to the current command for the motor based on the state variables as observed and the error as calculated.

* * * * *